Dec. 8, 1925.  
C. H. HAPGOOD  
COUNTING SCALE  
Filed Sept. 10, 1923
1,564,845
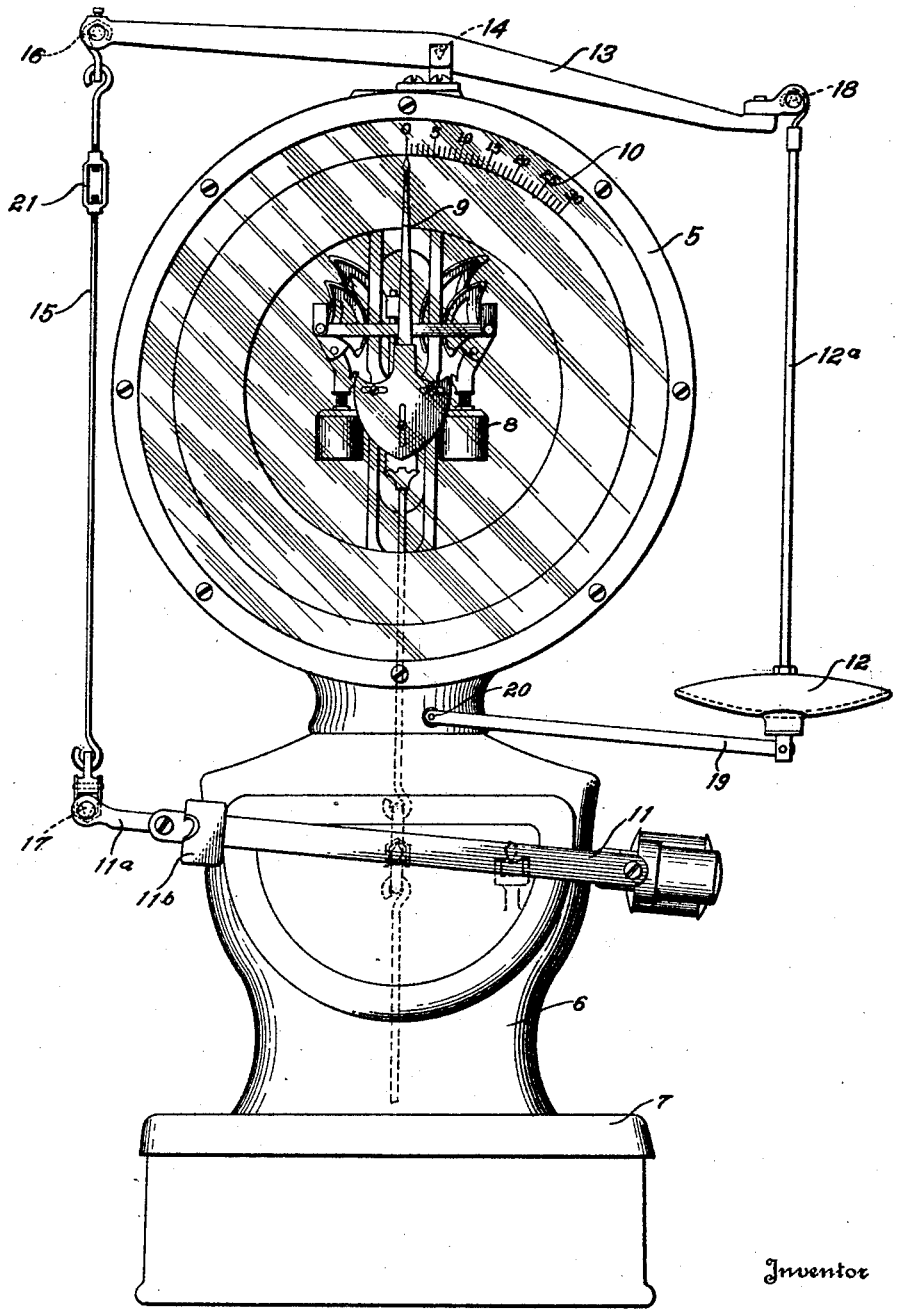
Inventor  
Clarence H. Hapgood  
By *Marshall*  
Attorney Patented Dec. 8, 1925.

1,564,845

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

COUNTING SCALE.

Application filed September 10, 1923. Serial No. 661,738.

*To all whom it may concern:*

Be it known that I, CLARENCE H. HAPGOOD, a citizen of the United States, and resident of Toledo, in the county of Lucas and State of Ohio, have invented new and useful Improvements in Counting Scales, of which the following is a specification.

This invention relates to automatic weighing scales capable of counterbalancing and indicating the weight of commodities placed on the scale platform and also of offsetting the weight of such commodities, or a major portion of them, by an additional leverage mechanism, herein called a ratio mechanism, carrying a ratio pan to receive samples of the commodities being weighed. Thus in counting by weight a number of identical articles, as bolts or screws, are placed on the scale platform and one or more of such articles then placed in the ratio pan until the indicator hand of the scale returns to zero position (showing exact counterbalance by those in the ratio pan) or until the indicator hand is so close to zero that one more article placed in the ratio pan would swing the hand behind the zero position, in which case the major portion of the articles on the platform are counter-balanced by the ratio form mechanism and the remainder by the scale mechanism per se. The leverage of the ratio mechanism can be computed and arranged so that one article in the ratio pan counterbalances any desired number of identical articles on the scale platform, as for example fifty or one hundred, and the excess of articles over even fifties or hundreds are counterbalanced by the scale mechanism.

The primary object of the present invention is the provision of simple and efficient ratio mechanism freely movable with the scale mechanism without hindering its use for ordinary weighing transactions and co-acting with it in counting transactions.

A further object of the invention is the mounting of the ratio hand to prevent its swinging to set up vibration in the scale mechanism when articles are deposited therein.

Other objects and advantages will be apparent from the following description wherein reference is made to the accompanying drawing illustrating a preferred embodiment of my invention.

In the drawing, the figure shows a front elevation of a weighing scale equipped with my improved counting mechanism.

Referring now to the drawing, the numeral 5 designates a scale housing adapted to enclose the load-offsetting or counterbalancing mechanism of the scale and supported upon a suitable column 6. It is to be understood that any suitable platform and platform lever mechanism may be employed in connection with the counterbalancing mechanism of the scale, and that the counterbalancing mechanism may be of any approved type, various mechanisms well-known in the scale art being fully capable of performing the required functions. The embodiment herein illustrated is one that has been found to successfully demonstrate the capabilities of this invention, and shows a double pendulum scale of a well-known type adapted to be suitably connected through platform lever mechanism with the platform 7 so that upon the placing of commodities upon the platform the pendulums 8 will be swung to positions counterbalancing the weight of the load on the platform. Inasmuch as the present invention is not dependent upon any particular form of scale mechanism no attempt is made herein to show a complete scale mechanism nor the action of the scale in its load-offsetting operations, only so much of the scale mechanism being shown as is necessary to clearly portray the operation and co-action of the counting mechanism associated with the scale mechanism forming the claimed invention herein described. In the operation of the scale mechanism the pendulums 8 in reaching the positions offsetting the weight of the load on the platform swing the indicator hand 9 over the graduated chart 10 to indicate the weight of the load on the platform.

Intermediate the scale platform 7 and the pendulums 8 is arranged a tare or capacity-increasing beam 11 adapted to be moved by the leverage mechanism of the scale simultaneously with the pendulums 8 in offsetting loads placed upon the platform. This beam 11 is so connected that in weighing its extremity 11$^a$ is swung downwardly from the zero position shown in the drawing.

Suitably mounted to act against the movement of the scale mechanism in its weighing operations is an additional leverage mechanism, herein called the ratio mechanism, to enable the offsetting of loads on the platform 7 by means of articles placed in a ratio pan 12 forming part of the ratio mechanism. As herein shown the ratio mechanism comprises a lever 13 of the first order, pivoted, as at 14, upon bearings fixed upon the scale housing 5, a connecting link 15 arranged between pivots 16 and 17 on the lever 13 and beam 11 respectively, and a ratio pan 12 swung by means of the stem 12$^a$ from a pivot 18 on the other arm of the lever 13 from that carrying the pivot 16. The lower extremity of the ratio pan 12 is pivotally secured to one end of an anti-vibration link or links 19, the other extremity of which is pivoted, as at 20, to the scale housing in parallelogrammatic relation to the arm of the lever 13 supporting the ratio pan. Connecting link 15 is preferably provided with a turnbuckle 21 or other adjusting means for correctly positioning the bearings contacting with the pivots 16 and 17.

In operation, when it is desired to utilize the scale for ordinary weighing transactions, the commodity to be weighed is placed upon the platform 7 and the counterbalancing pendulums 8 are swung outwardly through through the connecting leverage mechanism to positions offsetting the weight of the commodity, the indicator hand 9 being simultaneously swung to a position indicating the weight of the commodity on the chart 10. If a box or other tare is involved its weight can be offset by moving the poise 11$^b$ along the tare beam 11 in the usual manner of weighing scales.

When, however, it is desired to use my scale for counting transactions, the bulk or mass of articles to be counted is placed upon the platform 7, which of course proportionately displaces the pendulums 8 to offset the weight of the articles and moves the indicator hand over the chart 10 in the manner above described. One or more articles identical with those on the platform are then placed in the ratio pan 12. The weight of the articles in the ratio pan acts against the weighing mechanism including the pendulums 8 and so relieves the pendulums from offsetting that portion of the weight now offset by the articles in the ratio pan, the pendulums 8 and attached indicator hand 9 returning part way toward their zero positions when each article is deposited in the ratio pan. The articles are placed in the ratio pan until the indicator hand coincides with the zero indication on the chart—which shows that the articles on the scale platform 7 are exactly counterbalanced by the articles in the ratio pan 12—or until the indicator hand 9 is so close to the zero position on the chart that one more article placed in the ratio pan will swing the indicator hand back of the zero indication on the chart—in which case the ratio mechanism offsets the major portion of the load on the scale platform and the pendulums 8 offset the remainder of such load on the platform. Supposing the ratio between the ratio pan 12 and platform 7 of the scale to be 100:1, the number of pieces in the ratio pan will offset a similar number of hundreds of articles on the scale platform.

Using a specific example, assume that 510 articles are deposited upon the scale platform. The articles are placed in the ratio pan until 5 have been deposited therein, at which time the indicator hand 9 is so close to the zero indication on the chart 10 that if a 6th article is placed in the ratio pan the indicator hand would be swung behind the zero indication. It is then evident that more than 500 and less than 600 articles are on the scale platform. To determine the overage, articles are taken from the scale platform until the indicator hand 9 exactly coincides with the zero indication on the chart, at which time exactly 500 articles remain upon the scale platform. The number removed in the instance assumed would be 10, which can be readily counted as removed Or reversing the counting transaction, if say 500 articles or parts are desired to be counted, 5 articles or parts are placed in the ratio pan 12 and then articles or parts dumped upon the scale platform until the indicator hand 9 exactly coincides with the zero indication on the chart 10, at which time exactly 500 articles or parts are on the scale platform.

The anti-vibration link 19, moving in parallel with the arm of the lever 13 carrying the ratio pan, prevents the swinging of the ratio pan when articles are deposited therein, and so prevents vibrations of the weighing mechanism and particularly the indicator hand 9 that might occur if the lower extremity of the ratio pan were unconnected with the link.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. A counting scale having a platform, weight-offsetting mechanism actuated therefrom including a beam, an upright housing supporting said beam and containing automatic indicating mechanism, said upright housing having a convex upper surface, an additional counterbalancing mechanism acting against said weight-offsetting mechanism and including a lever mounted adjacent the highest point on the convex upper surface of said housing, connections between the lever and the beam, and a ratio pan carried by the beam.

2. A counting scale having a base, a platform supported above said base, an upright housing mounted on said base, an indicating chart in the upper part of said housing, weight-offsetting mechanism actuated from said platform and including a beam mounted upon said housing below said indicating chart, an additional counterbalancing mechanism acting against said weight-offsetting mechanism and including a lever mounted upon said housing above said chart, connections between said lever and said beam, a ratio pan carried by said lever, and an anti-vibration link connected with the ratio pan and pivoted to the housing below said chart, said anti-vibration link being arranged in parallelism with the arm of the lever carrying the pan.

3. A counting scale having a base, a platform supported above said base, an upright housing upon said base, said housing having a convex upper surface, weight-offsetting mechanism supported by said housing and actuated from said platform, said weight-offsetting mechanism including a beam, an additional counterbalancing mechanism acting against said weight-offsetting mechanism and including an equal arm lever of the first order fulcrumed upon the upper convex surface of said housing adjacent the highest point thereof, connections between one arm of the lever and the beam, and a ratio pan carried by the other arm of the lever.

4. A counting scale having a base, a platform supported above said base, an upright housing mounted upon said base, the upper part of said housing containing an indicating chart, weight-offsetting mechanism supported by said upright housing and actuated from said platform, said weight-offsetting mechanism including a beam, an additional counterbalancing mechanism acting against said weight-offsetting mechanism and including a lever of the first order fulcrumed on the top of said housing, connections between one arm of the lever and the beam, a ratio pan carried by the other arm of the lever, and an anti-vibration link connected with the ratio pan and arranged in parallelism with the arm of the lever carrying the pan, said anti-vibration link being pivoted to said housing at a point below said indicating chart.

5. A counting scale having a frame, a platform supported above said frame, an upright housing mounted upon said frame and having a convex upper surface, said upright housing containing pendulum load-counterbalancing mechanism and an indicating chart connected thereto, a beam fulcrumed upon said housing and located below said indicating chart, said pendulum load-counterbalancing mechanism and beam being operatively connected to said platform, an additional counterbalancing mechanism acting against said pendulum load-counterbalancing mechanism and including a lever fulcrumed on the convex upper surface of the housing adjacent its highest point, connections between said lever and said beam, a ratio pan suspended from said lever, and an anti-vibration link pivoted to said ratio pan and to said housing at a point below said indicating chart, said link being in parallelogrammatic relation to the arm of said lever carrying said pan.

CLARENCE H. HAPGOOD.